United States Patent [19]

Marshall et al.

[11] 4,062,374

[45] Dec. 13, 1977

[54] HYDRAULIC VALVES AND HYDRAULIC SYSTEMS

[75] Inventors: John Stephen Marshall; John Frederick Dodd, both of Woking, England

[73] Assignee: Sperry Rand Limited, London, England

[21] Appl. No.: 673,310

[22] Filed: Apr. 2, 1976

Related U.S. Application Data

[63] Continuation of Ser. No. 467,860, May 8, 1974, abandoned.

[51] Int. Cl.$^2$ ........................ F15B 13/04; G05D 16/00

[52] U.S. Cl. ................................. 137/115; 137/596.13

[58] Field of Search ...................... 137/115, 116, 116.3, 137/116.5, 490, 493, 493.1, 493.4, 493.6, 117, 596.12, 596.13; 251/38, 44

[56] References Cited

U.S. PATENT DOCUMENTS

| | | | |
|---|---|---|---|
| 2,759,487 | 8/1956 | Lornitzo | 137/490 |
| 3,234,957 | 2/1966 | Allen | 137/596.12 |
| 3,330,298 | 7/1967 | Allen | 137/493 |
| 3,411,416 | 11/1968 | Herd et al. | 137/117 |
| 3,412,753 | 11/1968 | Baker | 137/490 |
| 3,455,210 | 7/1969 | Allen | 137/596.13 |
| 3,467,126 | 9/1969 | Ballard et al. | 137/596.12 |
| 3,608,580 | 9/1971 | Hohmann | 137/490 |
| 3,722,543 | 3/1973 | Tennis | 137/596.12 |
| 3,827,453 | 8/1974 | Malott et al. | 137/596.12 |
| 3,980,095 | 9/1976 | McAvoy | 137/596.13 |

*Primary Examiner*—Martin P. Schwadron
*Assistant Examiner*—G. L. Walton
*Attorney, Agent, or Firm*—Barnes, Kisselle, Raisch & Choate

[57] ABSTRACT

A combined compensator and off-loading valve comprising a system pressure gallery connected to a tank or low pressure gallery by a plunger valve, the plunger having a greater area than the valve seating, this differential area being exposed in operation to system pressure, the plunger being hollow and being closed at the end opposite the valve setting by a sliding sleeve bearing against a fixed abutment and having a cross-sectional area equal to the plunger differential area, and a pin bearing against a caged compensator spring, the plunger being urged against the valve seating by a light spring, and means being provided for admitting load pressure to the interior of the plunger. The valve plunger may incorporate a pilot relief valve so that the valve opens when the pressure becomes excessive.

7 Claims, 1 Drawing Figure

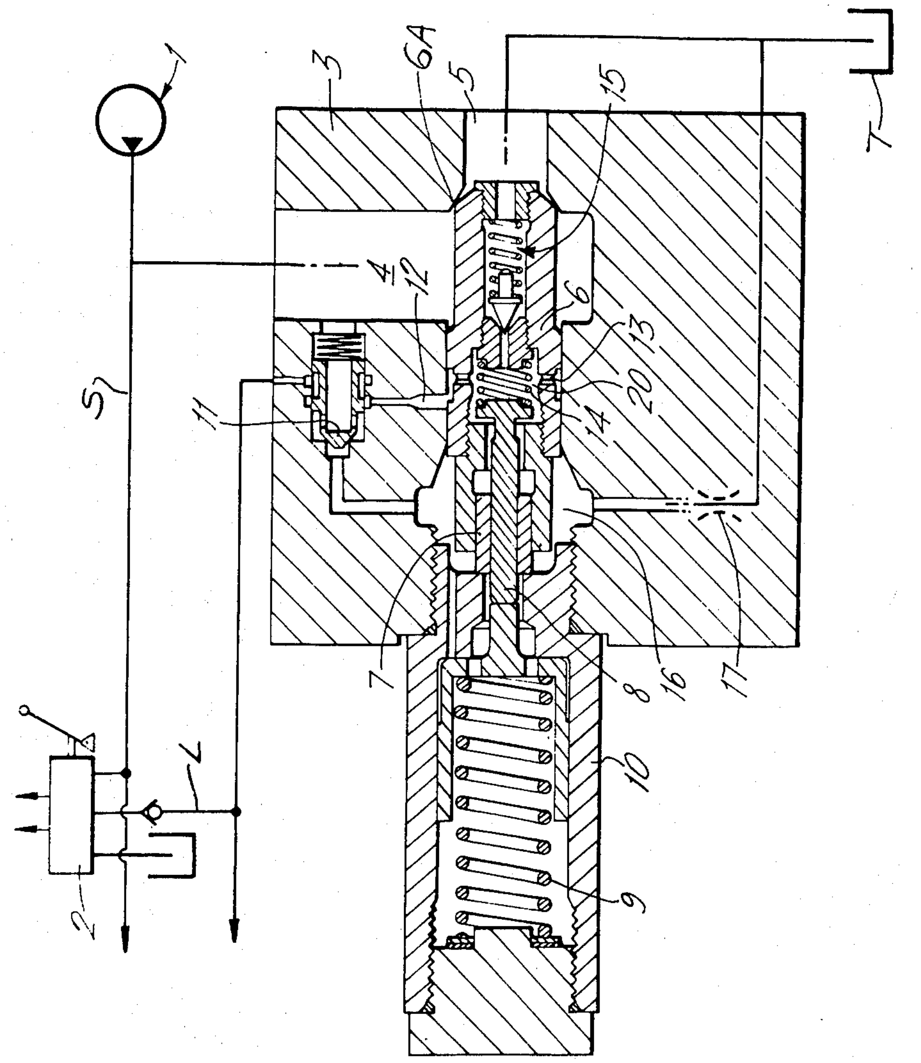
1
3
6A
5
15
T
4
12
6
13
20
14
S
11
7
8
16
17
L
10
9
2

HYDRAULIC VALVES AND HYDRAULIC SYSTEMS

This is a continuation of application Ser. No. 467,860, filed May 8, 1971 now abandoned.

The present invention relates to hydraulic valves and to hydraulic systems incorporating such valves.

In hydraulic systems in which hydraulic fluid is supplied under pressure to a load by a fixed displacement pump through control valves, the control valves are usually of the open center type so that when they are all in the neutral position fluid can pass directly to tank. In this condition the pump is off-loaded, having to work only against the pressure drop in the pipes and valves of the system.

In systems employing variable displacement pumps the valves are normally of the closed center type and may be provided with load sensing means, the sensed load pressure being supplied to a compensator which controls the pump displacement so as to maintain the system pressure always at a fixed margin above the highest load pressure.

While it is possible in principle to apply load sensing to a system employing a fixed displacement pump, such a system would be wasteful of power, in that with all the control valves in the neutral position the pump would still have to work against the pressure margin set by the compensator and would never be fully off-loaded.

It is an object of the present invention to provide a hydraulic valve which will act as a combined compensator and off-loading valve controlling the system pressure in operation to maintain an adequate maximum margin above the load pressure but allowing the compensator to be off-loaded to below the compensator setting when zero load is being sensed. The invention includes systems comprising such valves in combination with a fixed displacement pump and one or more control valves provided with load sensing means.

A combined compensator and off-loading valve according to the present invention comprises a system pressure gallery connected to a tank or low pressure gallery by a plunger valve, the plunger having a greater area than the valve seating, this differential area being exposed in operation to system pressure, the plunger being hollow and being closed at the end opposite and valve seating by a sliding sleeve bearing against a fixed abutment and having a cross sectional area equal to the plunger differential area, and a pin bearing against a caged compensator spring, the plunger being urged against the valve seating by a light spring, and means being provided for admitting load pressure to the interior of the plunger.

The valve plunger may incorporate a pilot relief valve so that the valve opens when the pressure becomes excessive.

The end of the plunger remote from the valve seating may be enclosed by a gallery communicating to tank through a restrictor and isolated from system pressure by a check valve which, when opened, also serves as an isolating valve for the load sensing line. This arrangement will cause the valve to open if the system pressure falls below tank (low pressure side of system) pressure by reason of an over-running load, and thereby enable hydraulic fluid to flow back into the system through the valve to make up the demand of the over-running load.

The invention also includes valves of the kind described above in combination with a fixed displacement pump and one or more control valves provided with load sensing means.

The invention will be further described by way of example with reference to the accompanying drawing which is a schematic axial section through a valve according to the invention and showing diagrammatically its connection to a fixed displacement pump and one of the control valves of the system in which it is employed.

Referring now to the drawing, the system comprises a fixed displacement pump 1 supplying hydraulic fluid through a supply line S under pressure to a control valve 2. The valve of the invention comprises a valve body 3 having a system pressure gallery 4 communicating with a tank port 5 through a seat 6A which may be closed by a plunger 6. The plunger 6 is cylindrical in form and reduced in diameter at the end nearest the seating so that the diameter of the seat 6A is less than that of the body of the plunger.

The plunger 6 is hollow and closed at its rear end by a sleeve 7, and a co-axial pin 8. The cross-sectional area of the sleeve 7 is equal to the difference between the areas of the body of the plunger 6 and the valve seat 6A.

The pin 8 bears against a compensator spring 9 enclosed in a cage 10 so that when the spring is compressed away from the cage it transmits a force to the interior of the plunger body by means of the pin.

The load sensing line L, which receives the highest sensed load pressure from the control valve 2 or valves, is connected through an isolator and check valve 11 to a load pressure gallery 12 communicating by a control orifice 13 with the interior of the plunger 6, so that under normal operating conditions the highest load pressure is applied to the inside of the plunger body. A light spring 14 acting on the pin 8 bears against the inside of the plunger, urging it towards the valve 6A and optionally a pilot relief valve 15, which may be of conventional design, is provided between the interior of the plunger and the area within the 6A which is exposed to tank pressure through the tank port 5.

A low pressure gallery 16 is provided at the rear end of the plunger and this and the interior of the compensator spring cage 10 are normally at tank or low system pressure. In the form of valve shown in the FIGURE they are connected to tank through a line T a control orifice 17, the function of which will be described below.

The normal operation of the valve will now be described. For the purpose of this description it will be assumed that the pressure margin (i.e. the amount by which the pump delivery pressure exceeds the pressure in the load sensing line) set by the compensator is to be 300 lbs. per sq. inch, and this is achieved by arranging that the force of the compensator spring 9 acting over the difference in area between the plunger body and valve seating is equivalent to a pressure of 300 lbs. per sq. inch. Further, it will be assumed that the light spring 14 acting over the same area difference is equivalent to a pressure of 10 lbs. per sq. inch.

First let it be supposed that all the control valves are in their neutral positions so that the load sensing line is at tank pressure. The pressure within the body of the plunger 6 and that in the gallery 16 will also be tank pressure through line T, and the only forces acting on the plunger in this condition are the system pressure in the gallery 4 plus any pressure from the tank or low pressure line T acting on the area of gallery 5 tending to open the valve, and the pressure of the light spring 14 tending to close it. The resultant of these forces causes the valve plunger to adopt a position such that the system pressure is only 10 lbs. per square inch above tank pressure, so that the fixed displacement pump 1 is off-loaded.

If one or more of the control valves is operated, the highest load pressure is applied through the valve 11 whose function will be described below, and through the gallery 12 and passages 13 to the interior 20 of the plunger 6. This pressure acts on the sleeve 7 and the pin 8 urging these to the left in the view shown in the FIGURE and so by their reaction further urges the plunger towards the closed position of the valve and causing the system pressure to rise so that it is always maintained above load pressure.

When the sensed load pressure exceeds 300 lbs. per sq. inch the compensator spring 9 begins to be compressed away from the walls of its retaining cage 10. If the forces acting on the plunger are now considered, the system pressure in the gallery 4 acting over the differential area between the plunger body and the seat 6A tends to urge the plunger away from the seat 6A. The load pressure acting over the equal area of the sleeve 7 tends to urge the plunger towards the closed position and to this is added the force of the spring 9 transmitted through the pin 8 which is equivalent to a pressure of 300 lbs. per sq. inch. The valve plunger 6 therefore moves so as to position itself to maintain the pressure in the system pressure gallery 4 at 300 lbs. per sq. inch above that sensed by the load sensing lines. Under load conditions, therefore, the valve acts as a compensator, maintaining a pressure margin of 300 lbs. per sq. inch, while in no-load conditions the valve maintains the very much smaller off-loading pressure of 10 lbs. per sq. inch.

Optionally, a relief valve element 15 is fitted in the plunger. This is set to open at a pressure equal to the desired maximum system pressure minus the pressure margin for which the compensator is set. When the system is overloaded the pressure in the load sensing line will reach the opening pressure set for the pilot element and establishes a flow path to the tank line.

Flow enters chamber 20 via one or more fixed orifices and since it is the pressure within this chamber acting on the sleeve 7 and pin 8 that tends to close the main valve and maintain system pressure, then the opening of the pilot element and the induced pressure difference between the load line and that in chamber 20, causes the forces acting at the pump supply end of the plunger 6 to overcome those produced by the load line pressure, resulting in the plunger moving off its seat and the immediate reduction in system pressure.

The function of the control orifice 17 and the isolating and check valve 11 will now be described. These components are provided so that the valve will open when pressure in the system falls below tank pressure due to an over-running load. When this condition occurs the valve element 11, which normally connects the load line to the gallery 12 and isolates the gallery 16 from system pressure, is moved off its seat 6A. This isolates the load sensing line L but permits the reduced pressure in the system pressure gallery 4 to be applied to the gallery 16 at the rear of the plunger and to the interior of the plunger, causing the valve to open fully. Fluid is then drawn from the tank or low pressure port 5 back into the system to make up the demand of the over-running load. It may be found in certain conditions that system characteristics are best suited by replacing the control orifice by a check valve.

We claim:

1. A combined compensator and off-loading valve for use with a system including a fixed displacement pump and a load-sensing line for sensing load pressure, comprising a valve body having a system pressure gallery for connection to a pump outlet, said body having a low pressure gallery for connection to a pump return line, said body having a load pressure gallery for connection to a load sensing line, said body including a valve seat between said system pressure gallery and said low pressure gallery, a plunger valve within said body adapted to engage said valve seat and providing communication when opened between said system pressure gallery and said low pressure gallery, said plunger having a greater cross-sectional area than the area of said valve seat, the differential area being adapted to be exposed in operation to system pressure, said plunger being hollow, a fixed abutment on said body, a sliding sleeve fitted within said plunger at the end opposite said valve seat and bearing against said fixed abutment, said sleeve having a cross-sectional area equal to said plunger differential area, a caged compensator spring on said valve body, a pin passing through said sleeve and bearing against said caged compensator spring and a light spring positioned between said pin and said plunger to urge said plunger against said valve seat, and connection means between the load-scanning gallery and the interior of said hollow plunger to transmit the load pressure to the interior of said plunger and on the end of said sleeve opposite said abutment and the end of said pin opposite the end which bears on said compensator spring such that the load pressure on said sleeve and said pin tends to move said plunger toward engagement with said seat and when the load pressure exceeds a predetermined value, the compensator spring is compressed, said plunger is moved by the pressure on said sleeve and the added pressure from the compression of said compensator spring to a position to maintain pressure in the system pressure gallery at a pressure equal to said predetermined pressure above said load pressure.

2. A combined compensator and off-loading valve according to claim 1 in which the valve plunger incorporates a pilot relief valve so as to cause the main plunger to open fully when the pressure exceeds that for which the pilot is set.

3. A combined compensator and off-loading valve according to claim 2 in which the end of the plunger remote from the valve seating is enclosed by a gallery communicating with the low pressure gallery through a restrictor in said valve body and isolated from system pressure by a valve in said valve body which when opened isolates the load sensing line so as to enable the plunger valve to open if the supply pressure falls below that on the low pressure side of the system.

4. A combined compensator and off-loading valve according to claim 1 in which the end of the plunger remote from the valve seating is enclosed by a gallery communicating with the low pressure gallery through a restrictor in said valve body and isolated from system pressure by a valve in said valve body which when opened isolates the load sensing line so as to enable the plunger valve to open if the supply pressure falls below that on the low pressure side of the system.

5. The combination comprising a fixed displacement pump having an outlet, a system pressure line connected to said outlet for supplying a load, a load sensing line for sensing the highest load pressure of fluid, a tank line for returning fluid to a source of fluid, and a combined compensator and off-loading valve comprising a valve body, said valve body having a system pressure gallery connected to said system pressure line, said valve body having an outlet to said tank line, said outlet communicating with said system pressure gallery, a valve seat between said system pressure gallery and said outlet, a plunger in said valve body adapted to engage said valve seat, said plunger having a greater cross sectional area than the area of said valve seat, said system pressure gallery applying system pressure to said differential area, said plunger being hollow, a sleeve within said plunger, a pin extending through said sleeve, the cross-sectional area of said sleeve being equal to said differential area, a compensator spring, a compensator cage on said valve body in which said compensator spring is enclosed, said pin bearing against said compensator cage, said valve body having a load pressure gallery adjacent said plunger, said plunger having a control orifice therein providing communication between said load pressure gallery and the interior of said plunger and on the end of said sleeve opposite said abutment and the end of said pin opposite the end which bears on said compensator spring, a light spring positioned between said pin and said plunger and urging said plunger against said valve seat, .

said valve body having a low pressure gallery communicating with the interior of said compensator cage, said valve body having a passage extending from said low pressure gallery to the exterior thereof, such that the load pressure on said sleeve and said pin tends to move said plunger toward engagement with said seat and when the load pressure exceeds a predetermined value, the compensator spring is compressed, said plunger is moved by the pressure on said sleeve and the added pressure from the compression of said compensator spring to a position to maintain pressure in the system pressure gallery at a pressure equal to said predetermined pressure above said load pressure.

6. The combination set forth in claim 5 in which the valve plunger incorporates a pilot relief valve so as to cause the main plunger to open fully when the pressure exceeds that for which the pilot is set.

7. The combination set forth in claim 6 including an orifice in said passage from said low pressure gallery to the exterior of said body.

* * * * *